UNITED STATES PATENT OFFICE.

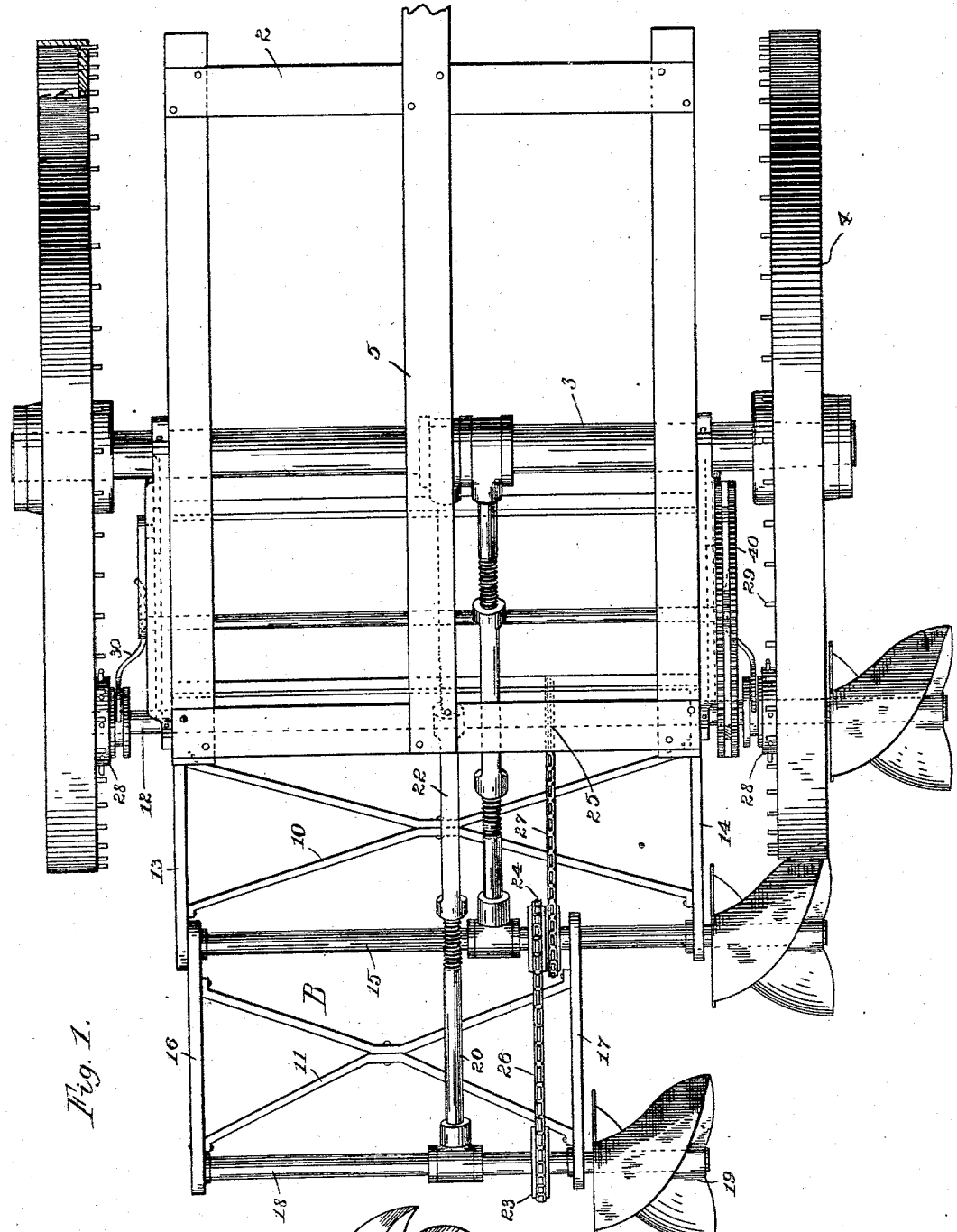

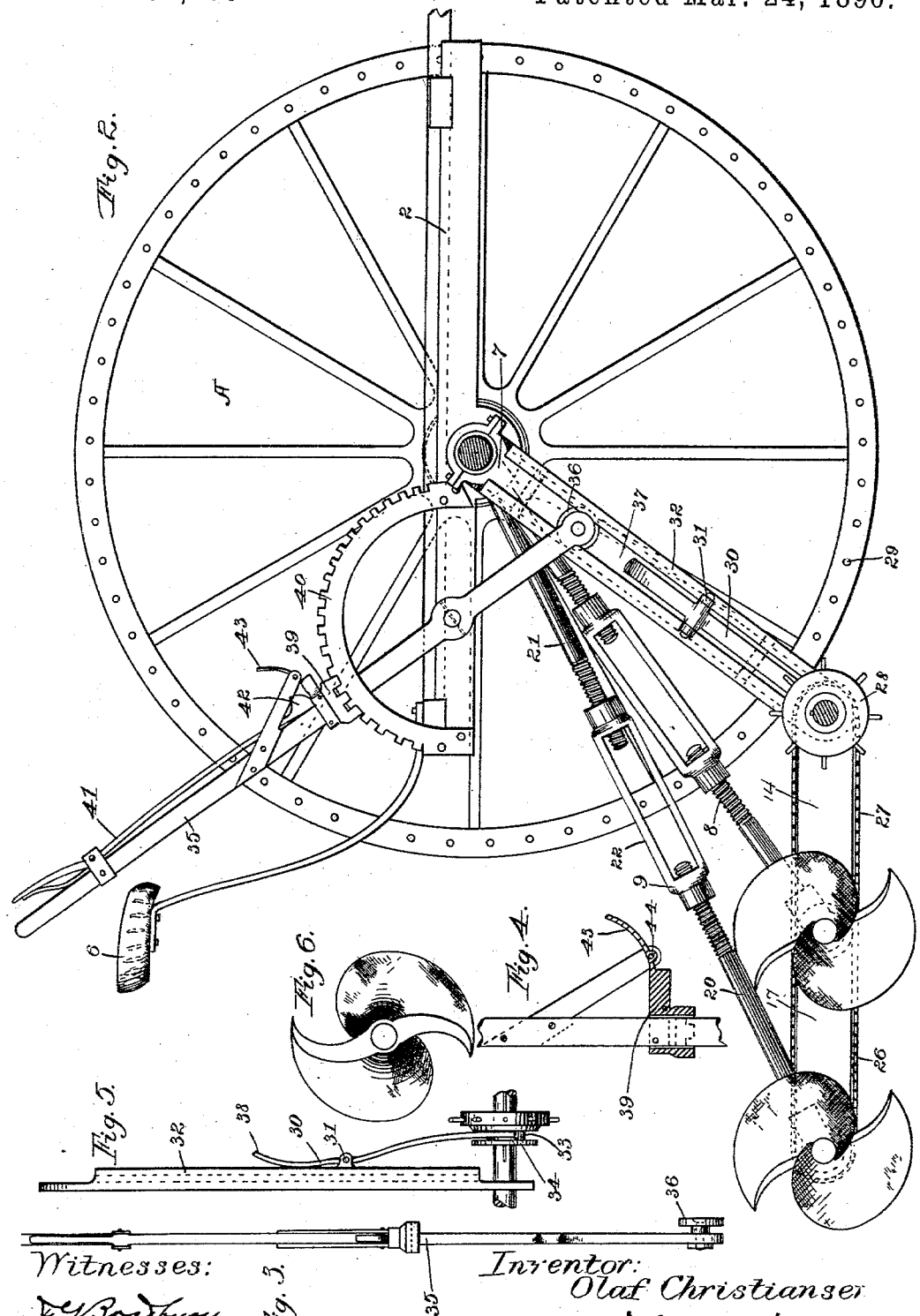

OLAF CHRISTIANSEN, OF ST. PAUL, MINNESOTA.

WHEEL-PLOW.

SPECIFICATION forming part of Letters Patent No. 556,735, dated March 24, 1896.

Application filed April 30, 1895. Serial No. 547,652. (No model.)

*To all whom it may concern:*

Be it known that I, OLAF CHRISTIANSEN, of St. Paul, Ramsey county, Minnesota, have invented certain Improvements in Wheel-Plows, of which the following is a specification.

My invention relates to improvements in wheel or sulky plows; and it consists in the novel features of construction hereinafter particularly described and claimed.

In the accompanying drawings, forming part of this specification, Figure 1 is a plan view of my machine. Fig. 2 is a side elevation of the same with one of the wheels and one of the plowshares removed. Fig. 3 is a detail of the power-arm for lifting the plowshare-carrying frame. Fig. 4 is a sectional detail of part of the power-arm. Fig. 5 is a detail of one of the brace-arms and attached clutch mechanism for throwing the plowshare-shafts into operative engagement with the wheels. Fig. 6 is a detail of a rotary plowshare having two blades, and Fig. 7 is a similar detail of a share provided with three blades.

In the drawings, A represents the vehicle or carriage, made up of the main frame 2, supported upon the axle 3, upon the ends of which are journaled the wheels 4, the frame 2 being provided with a suitable pole 5 and seat 6. Connected to the axle by means of the brace-arms 7, 8, and 9 is the adjustable plowshare-carrying frame B. This frame is shown made up of two parts, 10 and 11, the part or section 10 being secured to the brace-arms 7 by means of the shaft 12 passing loosely through the side pieces 13 and 14 of the frame and through the brace-arms 7, and the section 11 is mounted upon the shaft 15, passing loosely through the side pieces 16 and 17 and journaled in the sides 13 and 14 of the section 10, the sections turning upon said shafts as bearings in the adjustment of the frame. Journaled upon the ends of the shafts 12, 15, and 18 are the rotary plowshares 19, of any suitable form. The brace-arms 8 and 9 are made up of the similar threaded rods 20 and 21, one connected to the plowshare-shaft and the other to the axle of the machine and having an intermediate turnbuckle 22, so that the turning of either turnbuckle raises or lowers its connected shaft and plowshare.

Power is transmitted to the plowshares by means of the sprocket-wheels 23, 24, and 25 (see Fig. 1) mounted upon the plowshare-shafts and connected together by means of chains 26 and 27, the shaft 12 having operative connection with the wheel by means of the sprockets 28 slidably mounted upon the ends of the shaft and meshing with pins 29 upon the inner rims of the wheels. These sprockets are held in engagement with the wheels by means of suitable clutch mechanism. This, as shown, consists of the spring 30 fulcrumed by the pivot 31 to the brace-arms 7, the downwardly-projecting end of the spring resting in the groove 33 in the clutch 34 attached to the inner face of the sprocket, and the other end of the spring flaring outward, for the purpose hereinafter specified. The end of the hand-lever or power-arm 35 is provided with the antifriction-roll 36 working in the groove 37, formed by the turned-over edges 32 of the brace-arms 7. As the hand-lever is moved in one direction the roll descends in the groove, engaging the outwardly-flaring end 38 of the spring 30, turning the spring upon its pivot 31 and moving the clutch and connected sprocket inward and out of engagement with the wheel, and when the lever is moved in the opposite direction it carries the roll out of engagement with the spring, allowing the spring to act to force the sprocket again into engagement with the wheel.

The hand-lever 35 is fulcrumed to the side of the frame A, and is provided with the sliding dog 39 engaging the toothed segment 40 to hold the lever in adjusted positions. The spring-rod 41 upon the hand-lever is provided at its lower end with the dog or pawl 42, adapted to strike against the upwardly-curved flange 43 upon the dog 39, turning the dog upon its fulcrum-pivot 44 and out of engagement with the segment, allowing the hand-lever to be operated.

In the use of my machine it will be evident that by the proper adjustment of the brace-arms all of the plowshares will be normally kept upon the ground, but may be lifted at will by means of the hand-lever to avoid obstructions or for any other purpose; or, if desired, either the inside plowshare or the two inside shares may be lifted from the ground independently of the outside share and without interfering with its use by the shortening of their supporting brace-arms. It will also be evident that a larger or less number of plowshares may be used without departing from the idea of my invention.

I claim—

1. In a rotary plow, the combination with the vehicle-frame, axle and driving-wheels, of the plow-carrying frames, the hinge connections between said frames, and between the first frame and the axle, and the adjustable braces severally connecting said frames with said axle.

2. In a rotary plow, the combination with the axle, of the plow-carrying frame depending from and hinged upon said axle, the lifting-lever for raising and lowering the same, the series of other plow-carrying frames having hinge connection with each other and with said first frame, and the adjustable braces between the frames of said series and said axle.

3. In a wheel-plow, the combination with the vehicle-axle, of the plow hung from and hinged to said axle, the lifting-lever for said plow, the series of plows connected to said first plow, and the adjustable braces severally connecting them with the axle whereby the position of each plow may be adjusted independently, and the lifting of the first plow serves to lift all the others of the series.

4. In a wheel-plow, the combination with the axle, of the sectional frame the members of which are hinged together, the whole being hinged to the axle, the plow-shaft and plow carried by each frame, the lifting-lever for the first section, the adjustable braces connecting each other section independently with the axle, and means for driving said shafts.

5. In a wheel-plow, the combination with the vehicle-frame and its axle and carrying-wheels, of the series of plows and shafts their carrying-frames hinged together and having hinge-support upon said axle, the adjustable braces adapted to independently adjust the position of said shafts, the means for lifting said shafts, and the means for driving the same.

6. In a machine of the class described, the combination with the vehicle-frame and its running parts, of the plowshare-shafts supported thereby, the operative connection between said shafts and running parts, the means for adjusting each of said shafts vertically and the means for lifting all of said shafts from the ground.

7. In a wheel-plow, the combination with its axle, of the frame hinged upon and depending therefrom, the quadrant lever for raising and lowering the same, the shaft carried by said frame, its plow, the frame journaled upon said shaft, the shaft and plow carried by said second frame, the adjustable brace connecting said second shaft with the vehicle-axle, and the driving-gear connecting said shafts with the moving parts of said vehicle.

8. In a machine of the class described, the combination with the vehicle-frame and its axle and carrying-wheels, of the plowshare-shafts, the braces connecting said shafts with said axle, the sprockets carried by one of said shafts adjacent said wheels, the clutch mechanism carried by the brace-arms supporting said shaft, the power-arm fulcrumed upon said frame and engaging said brace-arms and clutch mechanism, and adapted to be operated to simultaneously withdraw said sprockets from engagement with said wheels and lift the plowshare-shafts from the ground.

9. In a rotary plow, the combination with the carrying-frame and the driving-wheels, of the plowshare-shafts, the gearing connecting said wheels with said shafts and the means for lifting said plowshares out of the soil and simultaneously disconnecting the gear from the driving-wheels.

In testimony whereof I affix my signature in presence of two witnesses.

OLAF CHRISTIANSEN.

Witnesses:
H. S. JOHNSON,
MINNIE L. THAUWALD.